(12) United States Patent
Yang et al.

(10) Patent No.: US 11,658,584 B2
(45) Date of Patent: May 23, 2023

(54) LLC RESONANCE CONVERTER AND METHOD OF CONTROLLING THE SAME

(71) Applicant: DELTA ELECTRONICS, INC., Taoyuan (TW)

(72) Inventors: Shang-Kay Yang, Taoyuan (TW); Hsien-Kai Wang, Taoyuan (TW); Yen-Wei Lin, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 1 day.

(21) Appl. No.: 17/534,846

(22) Filed: Nov. 24, 2021

(65) Prior Publication Data

US 2022/0416677 A1 Dec. 29, 2022

(30) Foreign Application Priority Data

Jun. 25, 2021 (CN) .......................... 202110711031.8

(51) Int. Cl.
*H02M 3/335* (2006.01)
*H02M 3/00* (2006.01)

(52) U.S. Cl.
CPC ......... *H02M 3/33592* (2013.01); *H02M 3/01* (2021.05); *H02M 3/33571* (2021.05); *H02M 3/33573* (2021.05)

(58) Field of Classification Search
CPC .. H02M 3/01; H02M 1/0096; H02M 3/33571; H02M 3/33573; H02M 3/33592; H02M 3/33584; Y02B 70/10; Y02P 80/10
See application file for complete search history.

(56) References Cited

U.S. PATENT DOCUMENTS

| | | | | |
|---|---|---|---|---|
| 9,379,628 B2* | 6/2016 | Zambetti | ................. | H02M 1/08 |
| 9,929,663 B1* | 3/2018 | Babazadeh | ....... | H02M 3/33592 |
| 2006/0187686 A1* | 8/2006 | Sun | .................... | H02M 3/33592 |
| | | | | 363/17 |
| 2008/0247194 A1* | 10/2008 | Ying | .................... | H02M 3/3376 |
| | | | | 363/21.02 |
| 2009/0303750 A1* | 12/2009 | Zhu | ................... | H02M 3/33507 |
| | | | | 363/21.02 |
| 2011/0205761 A1* | 8/2011 | Tschirhart | ........... | H02M 3/3376 |
| | | | | 363/21.02 |
| 2011/0254379 A1* | 10/2011 | Madawala | ........ | H02M 3/33584 |
| | | | | 307/104 |

(Continued)

*Primary Examiner* — Yusef A Ahmed
(74) *Attorney, Agent, or Firm* — Muncy, Geissler, Olds & Lowe, P.C.

(57) ABSTRACT

An LLC resonance converter includes a switching circuit, a resonance tank, a transformer, a synchronous rectification unit, and a control unit. The switching circuit includes a first switch controlled by a first control signal and a second switch controlled by a second control signal. The synchronous rectification unit includes a first synchronous rectification switch controlled by a first rectification control signal and a second synchronous rectification switch controlled by a second rectification control signal. The first control signal, the first rectification control signal, the second control signal, and the second rectification control signal include an operation frequency and a phase shift amount. When the operating frequency is lower to a specific value or the phase shift amount is higher to a specific value, the control unit fixes one of them to extend a hold-up time of the LLC resonance converter.

16 Claims, 14 Drawing Sheets

(56) References Cited

U.S. PATENT DOCUMENTS

| | | | | |
|---|---|---|---|---|
| 2013/0051096 A1* | 2/2013 | Carletti | ............... | H02M 1/4225 |
| | | | | 363/84 |
| 2015/0229220 A1* | 8/2015 | Lee | ................... | H02M 3/33592 |
| | | | | 363/21.02 |
| 2015/0229225 A1* | 8/2015 | Jang | ...................... | H02M 3/285 |
| | | | | 363/17 |
| 2015/0365005 A1* | 12/2015 | Panov | ................ | H02M 3/33584 |
| | | | | 307/24 |
| 2016/0105120 A1* | 4/2016 | Hirano | ............. | H02M 3/33584 |
| | | | | 363/17 |
| 2019/0097544 A1* | 3/2019 | Albertini | ........... | H02M 3/33592 |
| 2021/0203236 A1* | 7/2021 | Zhang | ............... | H02M 3/33561 |
| 2021/0226543 A1* | 7/2021 | Liang | ................ | H02M 3/33576 |
| 2022/0103080 A1* | 3/2022 | Yang | ...................... | H02M 1/15 |
| 2022/0103082 A1* | 3/2022 | Yang | ................ | H02M 3/33592 |
| 2022/0337166 A1* | 10/2022 | Chan | ......................... | H02J 7/06 |
| 2022/0345046 A1* | 10/2022 | Wang | ................ | H02M 3/33571 |

\* cited by examiner

LLC RESONANCE CONVERTER AND METHOD OF CONTROLLING THE SAME

BACKGROUND

Technical Field

The present disclosure relates to an LLC resonance converter and a method of controlling the same, and more particularly to an LLC resonance converter with extended hold-up time and a method of controlling the same.

Description of Related Art

The statements in this section merely provide background information related to the present disclosure and do not necessarily constitute prior art.

LLC resonance converter has advantages of ZVS turning on the primary-side switch, ZCS turning off the secondary-side synchronous rectification switch, and high efficiency. Take the full-bridge LLC resonance converter as shown in FIG. 2A as an example. The current control method provides PWM signals of the same phase for the first switch Q1 and the fourth switch Q4 on the primary side, and the first synchronous rectifier switch SR1 on the secondary side, and provides PWM signals of the same phase for the second switch Q2 and the third switch Q3 on the primary side, and the second synchronous rectifier switch SR2 on the secondary side. However, this control method has the following disadvantages when the input voltage is insufficient:

1. High-efficiency application. In order to achieve high efficiency, the voltage gain value is generally designed to be relatively low, but it may cause insufficient voltage gain and make the hold-up time lower.

2. High hold-up time application. In order to achieve a higher hold-up time, the voltage gain value is generally designed to be higher, but this will easily cause the efficiency to become low and additionally increase the voltage stress of the resonance capacitor in the resonance tank 2.

Accordingly, the present disclosure provides an LLC resonance converter and a method of controlling the same to maintain the LLC resonance converter 100 at high efficiency without shortening the hold-up time, and to avoid increasing the voltage stress of the resonance capacitor.

SUMMARY

In order to solve the above-mentioned problems, the present disclosure provides an LLC resonance converter. The LLC resonance converter includes a switching circuit, a resonance tank, a transformer, a synchronous rectification unit, and a control unit. The switching circuit includes a first switch and a second switch. The resonance tank is coupled to the switching circuit. The transformer includes a primary winding and a secondary winding, and the primary winding is coupled to the resonance tank. The synchronous rectification unit is coupled to the secondary winding, includes a first synchronous rectification switch and a second synchronous rectification switch. The control unit provides a first control signal to control the first switch, a second control signal to control the second switch, a first rectification control signal to control the first synchronous rectification switch, and a second rectification control signal to control the second synchronous rectification switch according to an output voltage of the resonance converter. The first control signal and the first rectification control signal have an operation frequency and a phase shift amount, and the second control signal and the second rectification control signal have the operation frequency and the phase shift amount. The control unit controls the operation frequency to be variable frequency and adjusts the phase shift amount when the operation frequency is lower than a phase shift frequency, and controls the operation frequency to be equal to the frequency threshold and adjusts the phase shift amount.

In order to solve the above-mentioned problems, the present disclosure provides an LLC resonance converter. The LLC resonance converter includes a switching circuit, a resonance tank, a transformer, a synchronous rectification unit, and a control unit. The switching circuit includes a first switch and a second switch. The resonance tank is coupled to the switching circuit. The transformer includes a primary winding and a secondary winding, and the primary winding is coupled to the resonance tank. The synchronous rectification unit is coupled to the secondary winding, includes a first synchronous rectification switch and a second synchronous rectification switch. The control unit provides a first control signal to control the first switch, a second control signal to control the second switch, a first rectification control signal to control the first synchronous rectification switch, and a second rectification control signal to control the second synchronous rectification switch according to an output voltage of the resonance converter. The first control signal and the first rectification control signal have an operation frequency and a phase shift amount, and the second control signal and the second rectification control signal have the operation frequency and the phase shift amount. The control unit controls the operation frequency to be variable frequency and adjusts the phase shift amount when the operation frequency is lower than a phase shift frequency, and controls the phase shift amount to be equal to a phase shift threshold and controls the operation frequency to be variable frequency when the phase shift amount is higher to the phase shift threshold.

In order to solve the above-mentioned problems, the present disclosure provides a method of controlling an LLC resonance converter. The LLC resonance converter includes a switching circuit, a transformer, and a synchronous rectification unit. The switching circuit includes a first switch controlled by a first control signal and a second switch controlled by a second control signal. The synchronous rectification unit includes a first synchronous rectification switch controlled by a first rectification control signal and a second synchronous rectification switch controlled by a second rectification control signal. The first control signal, the second control signal, the first rectification control signal, the second rectification control signal have an operation frequency. The method includes steps of: acquiring the operation frequency according to an output voltage; adjusting a phase shift amount of the first control signal and the first rectification control signal and adjusting the phase shift amount of the second control signal and the second rectification control signal according to the operation frequency; determining whether the operation frequency is lower than a phase shift frequency; controlling the operation frequency to be variable frequency and adjusting the phase shift amount when the operation frequency is lower than the phase shift frequency, and (a1) controlling the operation frequency to be equal to a frequency threshold and adjusting the phase shift amount when the operation frequency is lower to the frequency threshold, or (a2) controlling the phase shift amount to be equal to a phase shift threshold and controlling the operation frequency to be variable frequency when the phase shift amount is higher to the phase shift threshold.

The main purpose and effect of the present disclosure are to use the control unit to fix one of the operation frequency or the phase shift amount when the operation frequency of the LLC resonance converter is as low as a specific value or the phase shift amount is as high as a specific value so as to maintain the LLC resonance converter at high efficiency without shortening the hold-up time, and to avoid increasing the voltage stress of the resonance capacitor.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
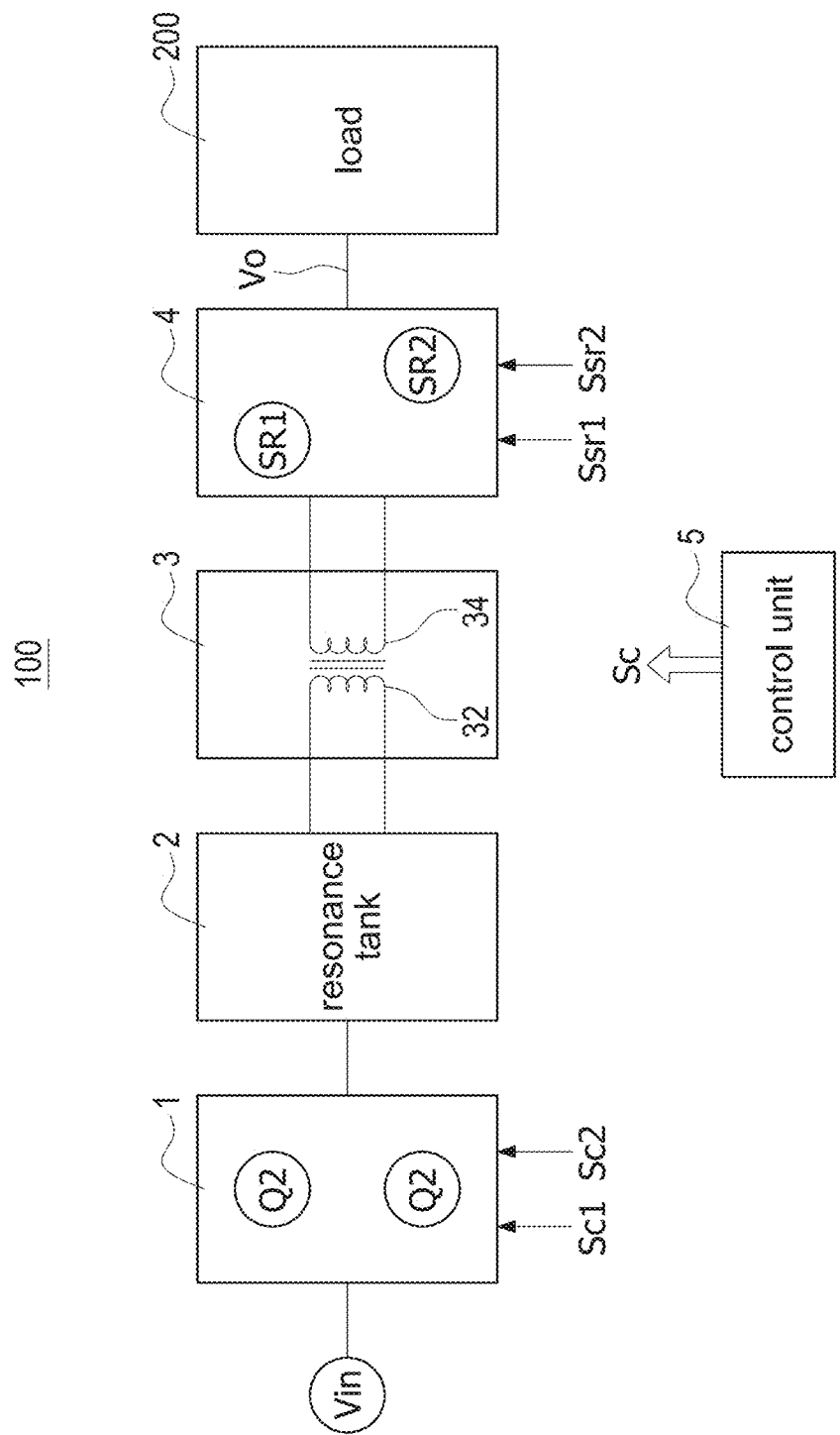
FIG. 1 is a block diagram of an LLC resonance converter with extended hold-up time according to the present disclosure.

Reference will now be made to the drawing figures to describe the present disclosure in detail. It will be understood that the drawing figures and exemplified embodiments of present disclosure are not limited to the details thereof.

Please refer to FIG. 1, which shows a block diagram of an LLC resonance converter with extended hold-up time according to the present disclosure. The LLC resonance converter 100 receives an input voltage Vin, converts the input voltage Vin into an output voltage Vo, and supplies the output voltage Vo to supply power to a load 200. The LLC resonance converter 100 includes a switching circuit 1, a resonance tank 2, a transformer 3, a synchronous rectification unit 4, and a control unit 5. The transformer 3 has a primary winding 32 and a secondary winding 34. The primary winding 32 is coupled to the switching circuit 1 and the resonance tank 2, and the secondary winding 34 is coupled to the synchronous rectification unit 4. The switching circuit 1 receives the input voltage Vin, and includes a first switch Q1 and a second switch Q2. The resonance tank 2 is coupled to the switching circuit 1 and the primary winding 32, and the resonance tank 2 occurs resonance by switching the first switch Q1 and the second switch Q2. The resonance tank 2 may include, for example but not limited to, a resonance circuit composed of a capacitor or an inductor. The synchronous rectification unit 4 is coupled between the secondary winding 34 and the load 200, and includes a first synchronous rectification switch SR1 and a second synchronous rectification switch SR2. When the LLC resonance converter normally works, a turned-on timing of the first synchronous rectification switch SR1 and that of the first switch Q1 of the switching circuit 1 are the same, and a turned-on timing of the second synchronous rectification switch SR2 and that of the second switch Q2 are the same.

The control unit 5 is coupled to the first switch Q1, the second switch Q2, the first synchronous rectification switch SR1, and the second synchronous rectification switch SR2, and provides control signals Sc according to the output voltage Vo, which is fed back by a feedback circuit, of the resonance converter 100. Specifically, the control signals Sc include a first control signal Sc1, a second control signal Sc2, a first rectification control signal Ssr1, and a second rectification control signal Ssr2 to respectively control the first switch Q1, the second switch Q2, the first synchronous rectification switch SR1 and the second synchronous rectification switch SR2.

Please refer to FIG. 2A to FIG. 2D, which show circuit diagrams of the LLC resonance converter according to four embodiments of the present disclosure, and also refer to FIG. 1. Take the full-bridge primary-side circuit 100-1 and the full-bridge secondary-side circuit 100-2 shown in FIG. 2B as an example. The primary-side circuit 100-1 includes a first switch bridge arm 12 and a second switch bridge arm 14 composed of the switching circuit 1, and a resonance tank 2. The first switch bridge arm 12 receives the input voltage Vin, and includes a first switch Q1 and a second switch Q2 coupled in series. The control unit 5 provides a first control signal Sc1 to control the first switch Q1, and provides a second control signal Sc2 to control the second switch Q2. The second switch bridge arm 14 is connected the first switch bridge arm 12 in parallel, and the second switch bridge arm 14 includes a third switch Q3 and a fourth switch Q4 coupled in series. The control unit 5 provides a third control signal Sc3 to control the third switch Q3, and provides a fourth control signal Sc4 to control the fourth switch Q4. In one embodiment, the first control signal Sc1 and the fourth control signal Sc4 are the same control signal, and the second control signal Sc2 and the third control signal Sc3 are the same control signal. The first control signal Sc1 and the second control signal Sc2 are interleaved control signals. Interleaving means that the phase difference is preferably 180 degrees, and may be complementary or non-complementary signals (for example but not limited to, the switch is turned off for a long time to cause the signals to be non-complementary, or there is a dead time between two signals). The resonance tank 2 is coupled between the first switch bridge arm 12 and the second switch bridge arm 14, and which is an LLC resonance tank 2 composed of a resonance inductance Lr, a magnetizing inductance (not shown) of the transformer 3, and a resonance capacitance Cr.

The secondary-side 100-2 includes a first synchronous rectification bridge arm 42 and a second synchronous rectification bridge arm 44. The first synchronous rectification bridge arm 42 is coupled to secondary winding 34 of the transformer 3, and includes a first synchronous rectification switch SR1 and a second synchronous rectification switch SR2 coupled in series. The second synchronous rectification bridge arm 44 is connected the first synchronous rectification bridge arm 42 in parallel, and includes a third synchronous rectification switch SR3 and a fourth synchronous rectification switch SR4. Specifically, a common-connected node between the first synchronous rectification switch SR1 and a second synchronous rectification switch SR2 and a common-connected node between the third synchronous rectification switch SR3 and the fourth synchronous rectification switch SR4 are respectively coupled to two ends of the secondary winding 34. The control unit 5 provides a first rectification control signal Ssr1 to control the first synchronous rectification switch SR1, provides a second rectification control signal Ssr2 to control the second synchronous rectification switch SR2, provides a third rectification control signal Ssr3 to control the third synchronous rectification switch SR3, and provides a fourth rectification control signal Ssr4 to control the fourth synchronous rectification switch SR4. The first rectification control signal Ssr1 and the fourth rectification control signal Ssr4 are the same control signal, and the second rectification control signal Ssr2 and the third rectification control signal Ssr3 are the same control signal. The first rectification control signal Ssr1 and the second rectification control signal Ssr2 are interleaved control signals.

Figure 2A:
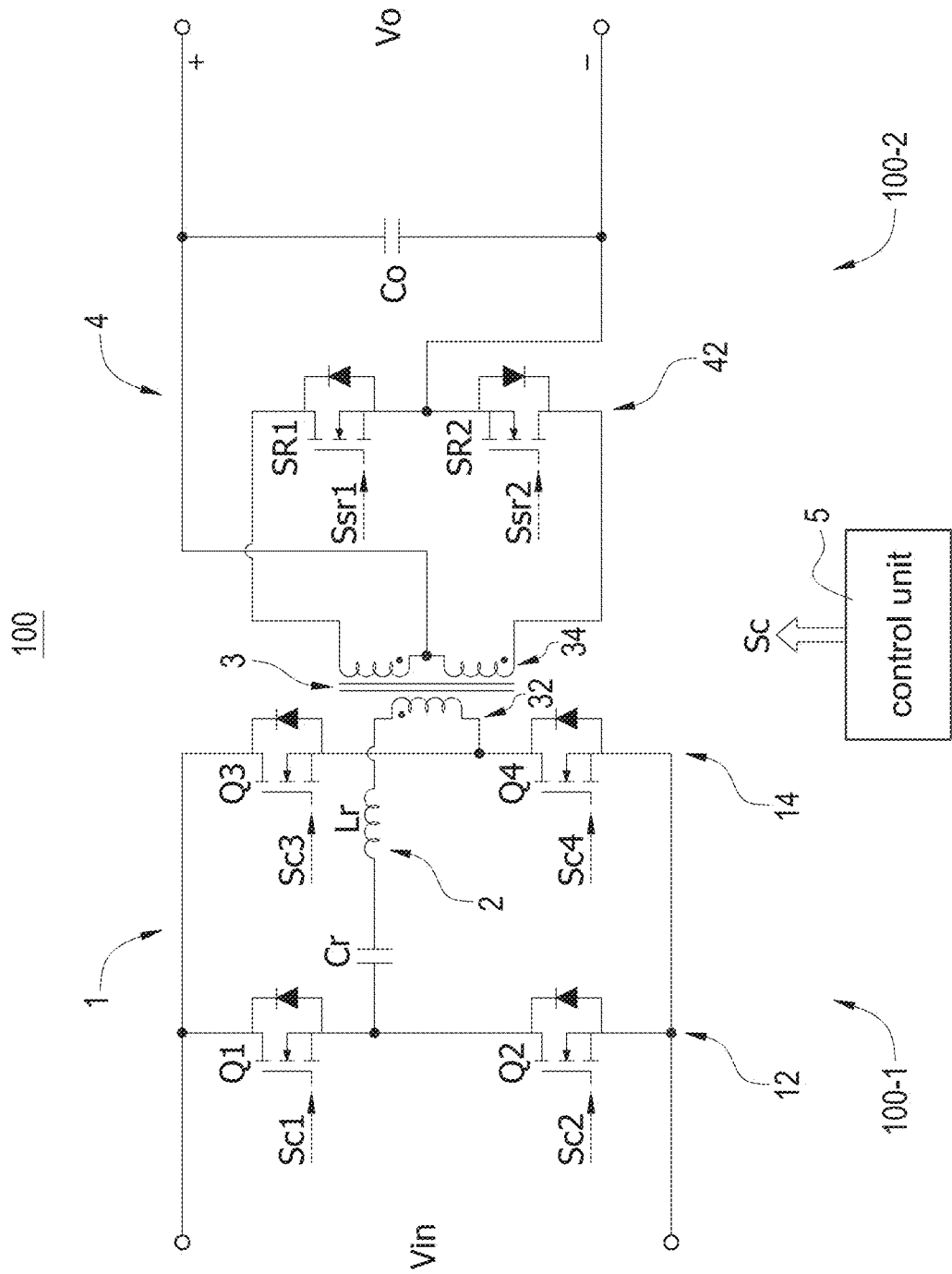
FIG. 2A is a circuit diagram of the LLC resonance converter according to a first embodiment of the present disclosure.
Figure 2B:
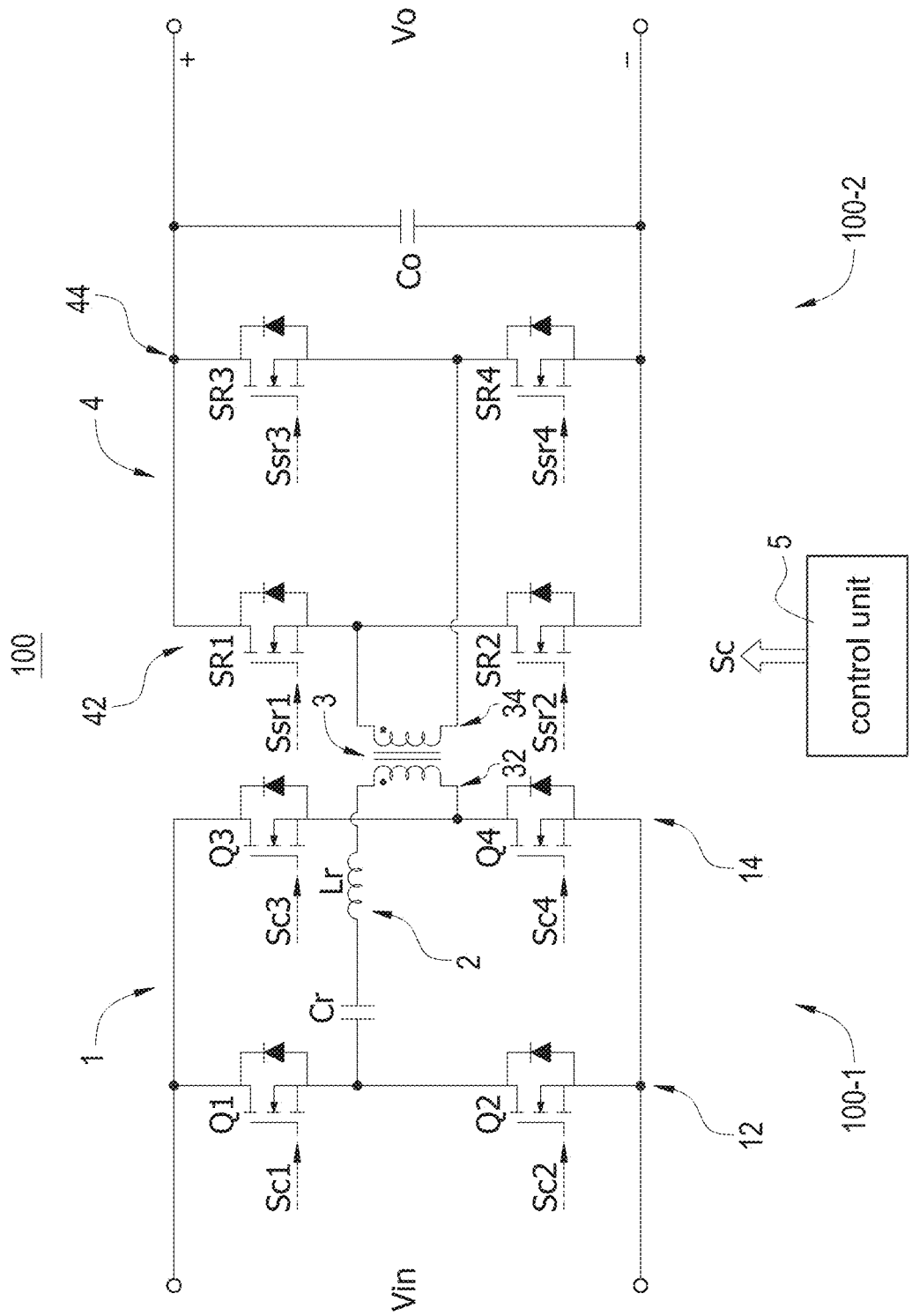
FIG. 2B is a circuit diagram of the LLC resonance converter according to a second embodiment of the present disclosure.
Figure 2C:
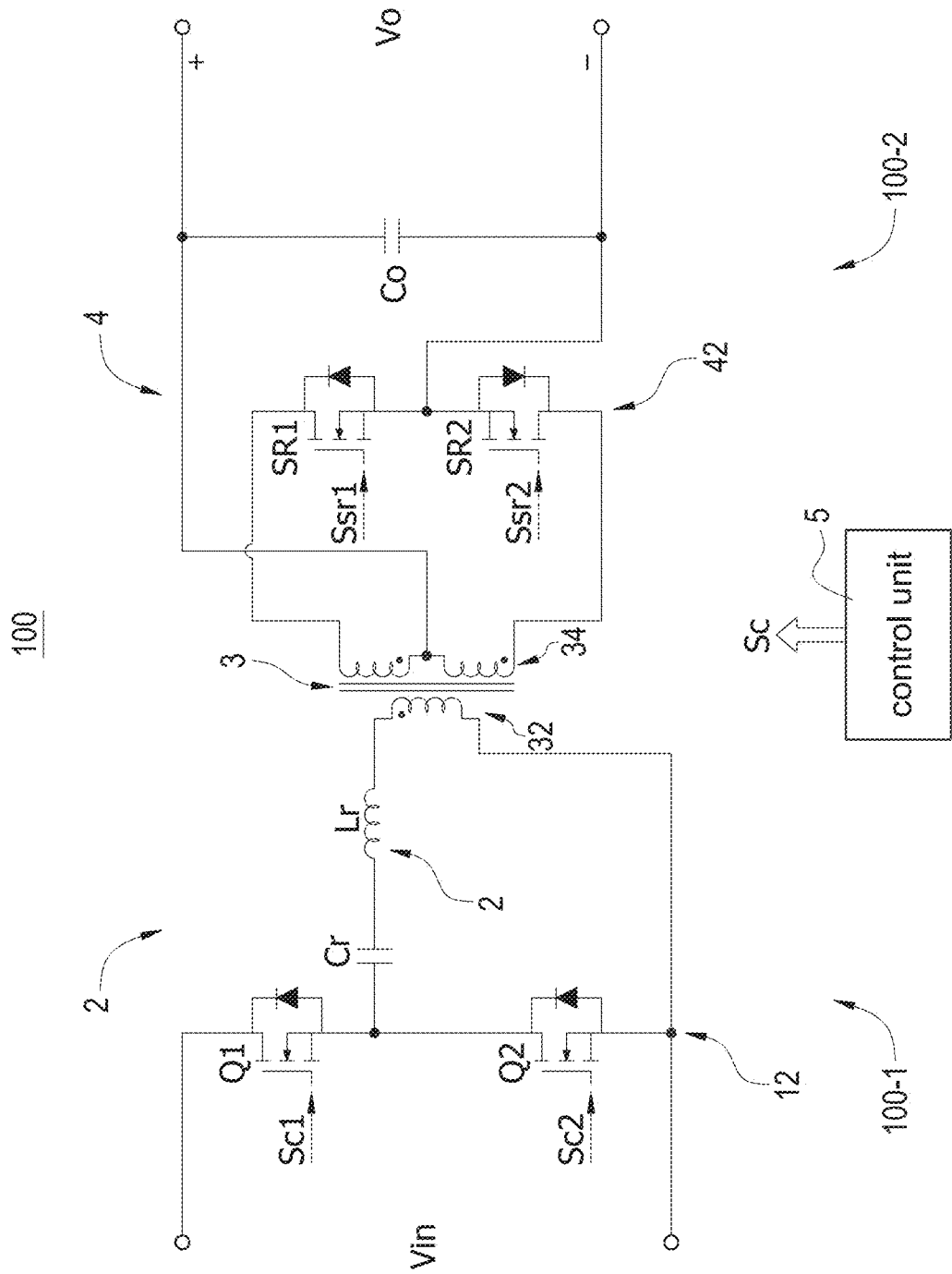
FIG. 2C is a circuit diagram of the LLC resonance converter according to a third embodiment of the present disclosure.
Figure 2D:
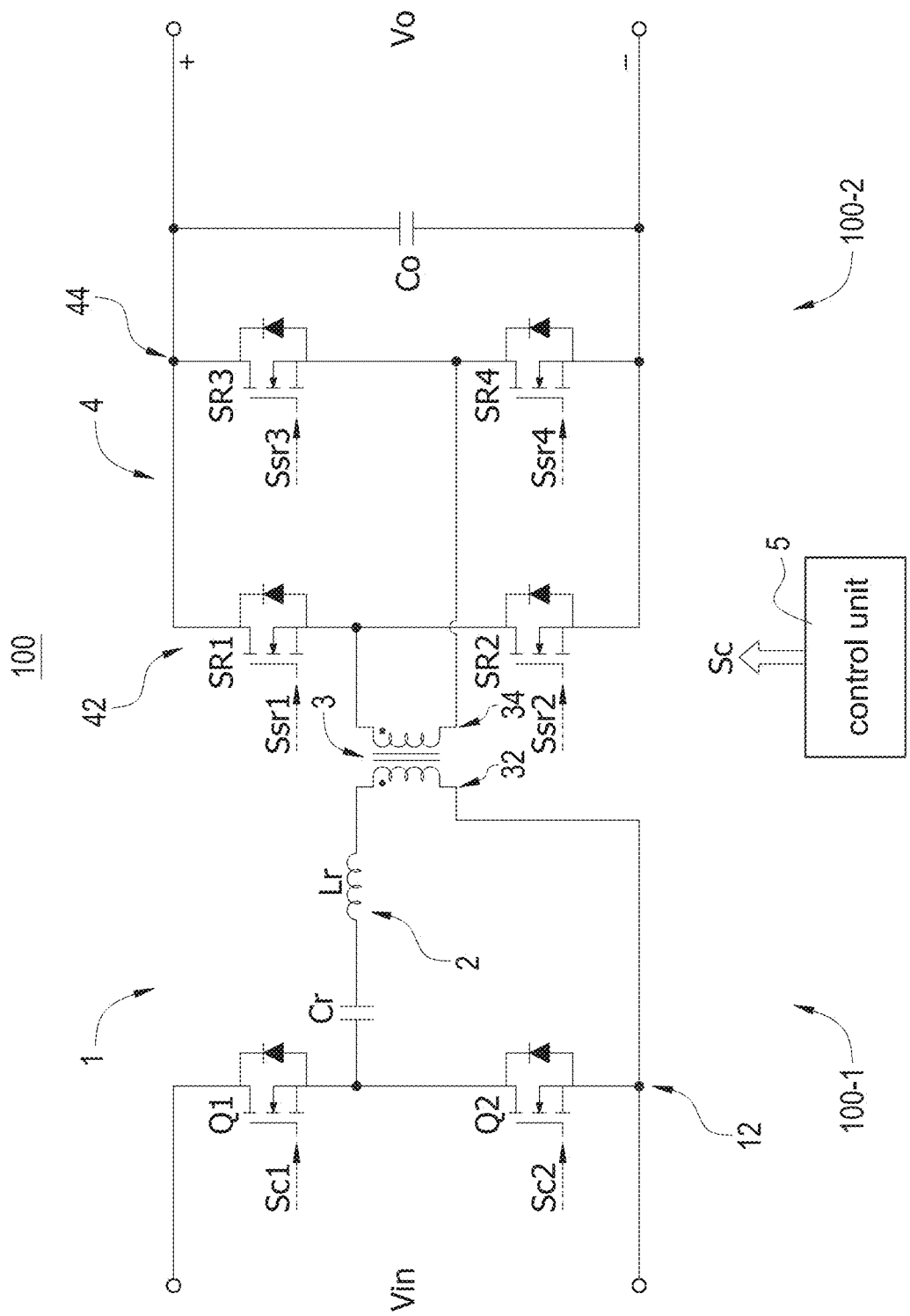
FIG. 2D is a circuit diagram of the LLC resonance converter according to a fourth embodiment of the present disclosure.

The primary-side circuit 100-1 of the LLC resonance converter 100 shown in FIG. 2C and FIG. 2D is a half-bridge structure. The secondary-side circuit 100-2 of the LLC resonance converter 100 shown in FIG. 2A and FIG. 2C is a center-tapped structure. In particular, the components and control signals shown in FIG. 2A to FIG. 2D, as well as the control description in the following paragraphs, use the same reference signs to indicate the same control methods, and the detail description is omitted here for conciseness.

Figure 3:
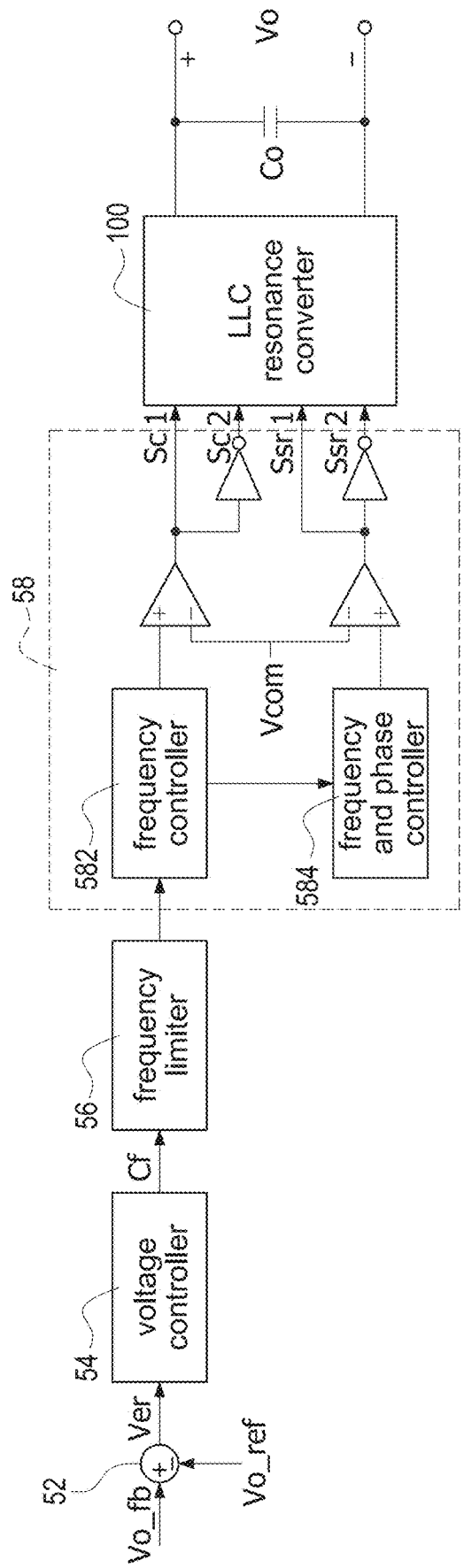
FIG. 3 is a block circuit diagram of a control unit according to the present disclosure.

Please refer to FIG. 3, which shows a block circuit diagram of a control unit according to the present disclosure, and also refer to FIG. 1 to FIG. 2D. In order to facilitate the description of the operation and control principle of the LLC resonance converter 100, the circuit topology shown in FIG. 2A is taken as an example for description. The control unit 5 receives an output voltage signal corresponding to the output voltage Vo of the LLC resonance converter 100, acquires a frequency control command Cf by feeding back the output voltage Vo, and controls an operation frequency Fsw of each control signal Sc for the LLC resonance converter 100 according to the frequency control command Cf. Specifically, the control unit 5 receives an output voltage feedback value Vo_fb and an output voltage reference value Vo_ref of the LLC resonance converter 100 through the comparison unit 52. The comparison unit 52 compares the output voltage reference value Vo_ref and the output voltage feedback value Vo_fb to acquire a voltage error value Ver.

A voltage controller 54 of the control unit 5 receives the voltage error value Ver, and calculates the voltage error value Ver to acquire the frequency control command Cf of controlling the operation frequency Fsw of each control signal Sc for the LLC resonance converter 100. Take the voltage controller 54 as a proportional integral controller (PI controller) as an example, the present disclosure is not limited by this. The voltage controller 54 performs a linear combination operation of proportional and integral for the voltage error value Ver to acquire the control command quantity, i.e., the frequency control command Cf. In order to ensure that the frequency control command Cf will not be higher than the maximum value of the control command quantity (that is, corresponding to the maximum frequency Fmax in FIG. 4A and FIG. 4B) or less than the minimum value of the control command quantity (that is, corresponding to the minimum frequency Fmin in FIG. 4A and FIG. 4B), the upper limit value and lower limit value of the frequency control command Cf are limited by a frequency limiter 56 to limit the maximum frequency Fmax and the minimum frequency Fmin of the operation frequency Fsw.

A signal modulation unit 58 of the control unit 5 includes a frequency controller 582 and a frequency and phase controller 584. The frequency controller 582 is used to adjust the operation frequency Fsw of the first control signal Sc1 and the operation frequency Fsw of the second control signal Sc2 according to the frequency control command Cf. The frequency and phase controller 584 is used to adjust the operation frequency Fsw and phase shift amount Vs of the first rectification control signal Ssr1 and the operation frequency Fsw and phase shift amount Vs of the second rectification control signal Ssr2. After the waveforms generated by the frequency controller 582 and the frequency and phase controller 584 are compared by the comparator and controlled by the logic circuit, the pulse width modulation signal generated is the first control signal Sc1, the second control signal Sc2, the first rectification control signal Ssr1, and the second rectification control signal Ssr2 corresponding to the frequency control command Cf. In one embodiment, the frequency controller 582 and the frequency and phase controller 584 may also control duty cycles of the first control signal Sc1, the second control signal Sc2, the first rectification control signal Ssr1, and the second rectification control signal Ssr2.

Figure 4A:
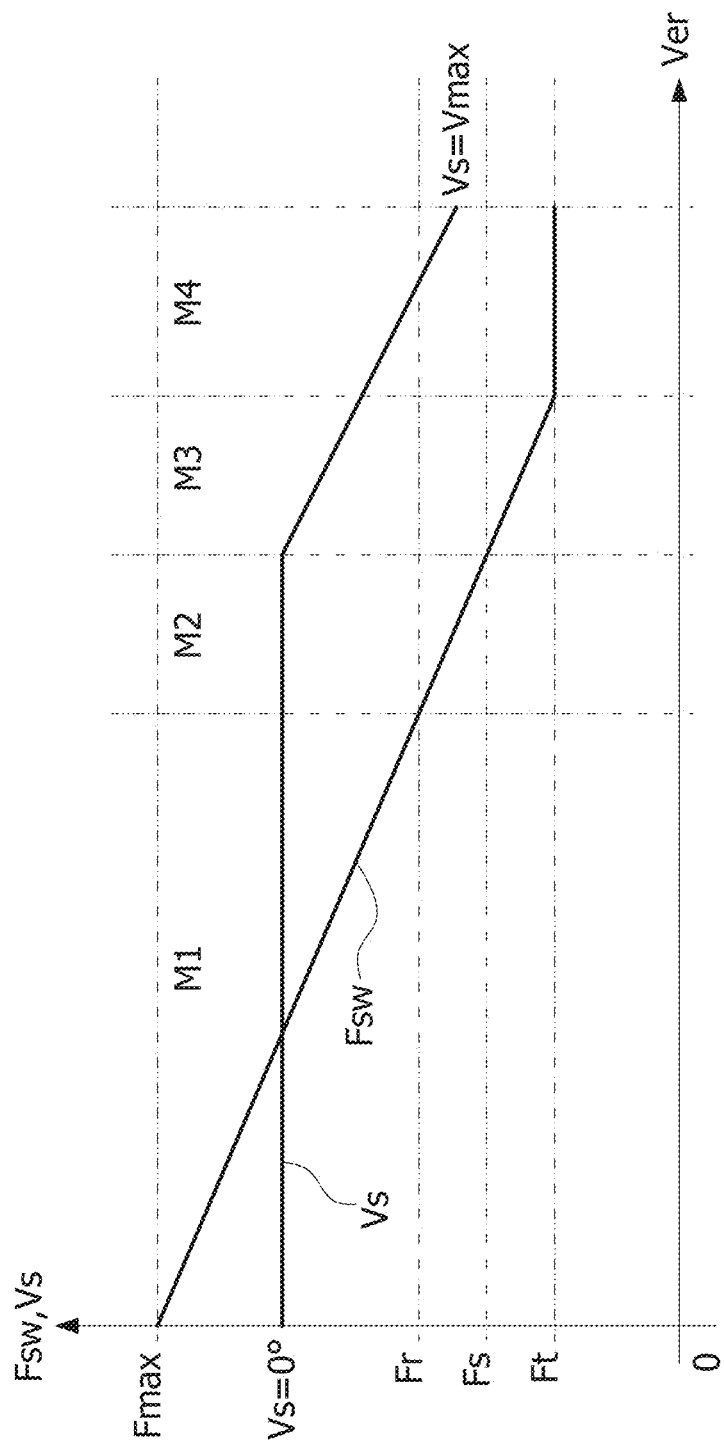
FIG. 4A is a schematic diagram of showing a frequency and a phase of the LLC resonance converter operating in a first control manner according to the present disclosure.
Figure 4B:
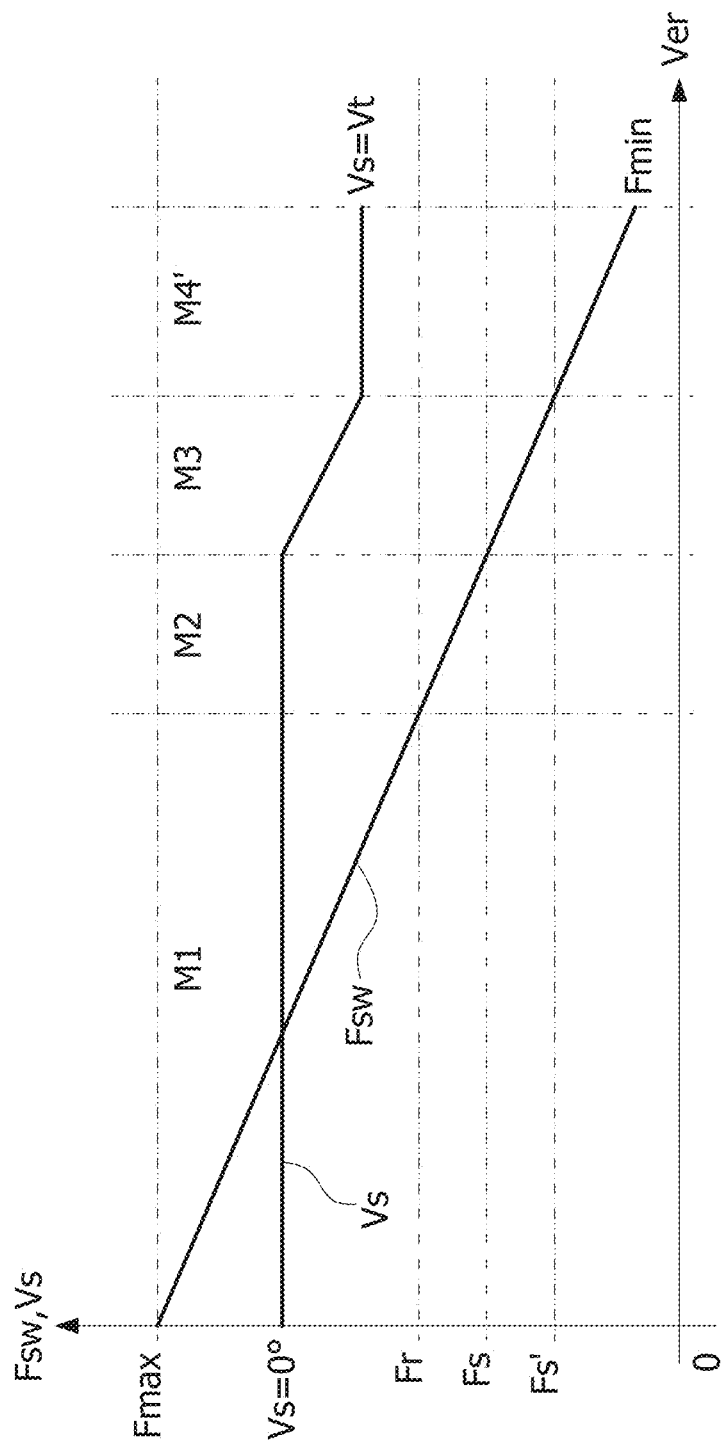
FIG. 4B is a schematic diagram of showing the frequency and the phase of the LLC resonance converter operating in a second control manner according to the present disclosure.

Please refer to FIG. 4A and FIG. 4B, which show schematic diagrams of showing a frequency and a phase of the LLC resonance converter operating in a first control manner and a second control manner according to the present disclosure, respectively, and also refer to FIG. 1 to FIG. 3. In FIG. 4A, when the operation frequency Fsw (related to the frequency control command Cf) is higher than a phase shift frequency Fs preset by the control unit 5 and higher than a resonance frequency Fr of the LLC resonance converter 100, the LLC resonance converter 100 operates in a first mode M1. In this mode, the control unit 5 controls the operation frequency Fsw of the first control signal Sc1 and the first rectification control signal Ssr1 to be variable frequency (frequency variation), and the phase shift amount Vs is zero degree. The frequency variation refers to that the operation frequency Fsw is adjusted with the change of the input voltage Vin, and the change of the input voltage Vin may be known by the feedback of the output voltage Vo. The phase shift amount Vs refers to the phase difference that the rectification control signals Ssr1, Ssr2 are turned-on and leading to the control signals Sc1, Sc2, and the difference (shift) range may be from zero degree to 180 degrees. In particular, the phase shift amount Vs of zero degree means that the two signals are turned on at the same time. Since the second control signal Sc2 and the second rectification control signal Ssr2 are interleaved with the first control signal Sc1 and the first rectification control signal Ssr1, respectively, the operation frequency Fsw and the phase shift amount Vs are the same as the first control signal Sc1 and the first rectification control signal Ssr1. The lower input voltage Vin, the operation mode of the LLC resonance converter 10 will gradually shift from the first mode M1 to the fourth mode M4. That means that the operation frequency Fsw will be lower, and the phase shift amount Vs will gradually increase from zero degree at the right time.

When the operation frequency Fsw is higher than the phase shift frequency Fs but lower than the resonance frequency Fr, the LLC resonance converter 100 operates in a second mode M2. In this mode, the control unit 5 controls the operation frequency Fsw of the first control signal Sc1 and the first rectification control signal Ssr1 to be variable frequency (frequency variation), and the phase shift amount Vs is zero degree (the same is true for the second control signal Sc2 and the second rectification control signal Ssr2). Simultaneously, the control unit 5 limits the duty cycle of the first rectification control signal Ssr1 and the second rectification control signal Ssr2 to not exceed the resonance period so as to prevent the energy of the secondary-side circuit 100-2 from being released to the primary-side circuit 100-1 during the switch operation.

When operation frequency Fsw is lower than the phase shift frequency Fs but higher than a frequency threshold Ft preset by the control unit 5, the LLC resonance converter 100 operates in a third mode M3. In this mode, the control unit 5 controls the operation frequency Fsw of the first control signal Sc1 and the first rectification control signal Ssr1 to be variable frequency (frequency variation), and adjusts the phase shift amount Vs according to the change of the input voltage Vin (the same is true for the second control signal Sc2 and the second rectification control signal Ssr2). Therefore, as the operation frequency Fsw becomes lower and lower, the phase shift amount Vs will gradually increase from zero degree. The phase shift amount Vs may be leading or lagging. That is, the control unit 5 controls the phase of the first rectification control signal Ssr1 to lead the phase of the first control signal Sc1 according to the operation frequency Fsw as low as the frequency threshold Ft, or controls the phase of the first control signal Sc1 to lag the phase of the first rectification control signal Ssr1 (the same is true for the second control signal Sc2 and the second rectification control signal Ssr2).

When the operation frequency Fsw continuously decreases to be equal to the frequency threshold Ft preset by the control unit 5, the LLC resonance converter 100 operates in a fourth mode M4. In this mode, the control unit 5 controls the operation frequency Fsw of the first control signal Sc1 and the first rectification control signal Ssr1 to be equal to the frequency threshold Ft, and the phase shift amount Vs is still adjusted according to the change of the input voltage Vin (the same is true for the second control signal Sc2 and the second rectification control signal Ssr2). Therefore, although the voltage error value Ver calculated by the control unit 5 may continue to increase, the operation frequency Fsw may be limited by setting the corresponding frequency threshold Ft in the voltage controller 54 or the signal modulation unit 58. The phase shift amount Vs is gradually increased according to the decrease of the input voltage Vin until the maximum phase shift amount Vmax before the LLC resonance converter 100 fails. In particular, the maximum phase shift amount Vmax may also be preset by the control unit 5.

In FIG. 4B, the curves of the LLC resonance converter 100 operating in the first mode M1 to the third mode M3 are the same as those in FIG. 4A, and the detail description is omitted here for conciseness. Until the phase shift amount Vs gradually increases from zero degree in the third mode M3 to the phase shift threshold Vt preset by the control unit 5, the LLC resonance converter 100 operates in a fourth mode M4'. In the mode, the control unit 5 controls the operation frequency Fsw of the first control signal Sc1 and the first rectification control signal Ssr1 be variable frequency (frequency variation), and controls the phase shift amount Vs to be fixed and be equal to the phase shift threshold Vt (the same is true for the second control signal Sc2 and the second rectification control signal Ssr2). The frequency threshold Fs' corresponding to the phase shift threshold Vt is determined by the control unit 5, but it is only the operation frequency Fsw at the current point.

Therefore, although the voltage error value Ver calculated by the control unit 5 may continue to increase and cause the operation frequency Fsw to continue to decrease, the phase shift amount Vs may be limited by setting the magnitude of the corresponding phase shift threshold Vt in the frequency and phase controller 584. The operation frequency Fsw is gradually decreased according to the decrease of the input voltage Vin until the minimum frequency Fmin before the LLC resonance converter 100 fails. In particular, the minimum frequency Fmin may also be preset by the control unit 5.

Figure 5A:
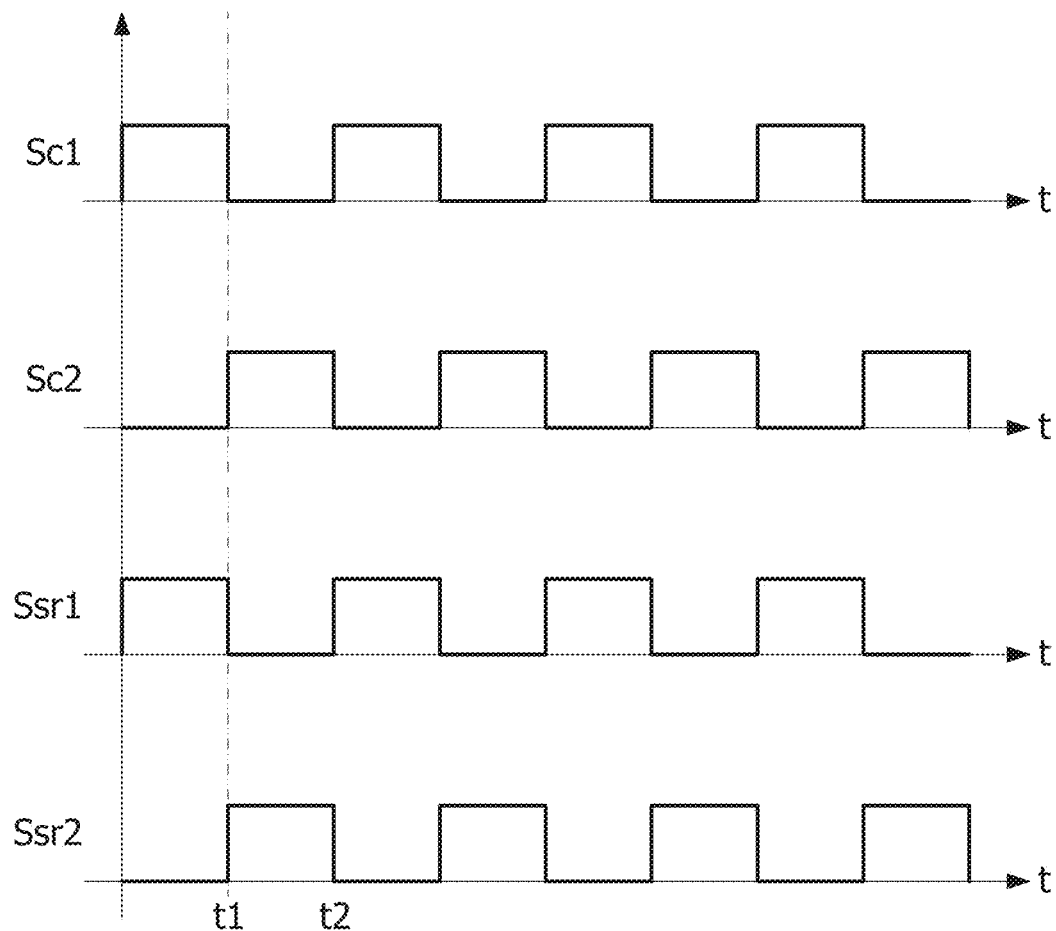
FIG. 5A is a schematic diagram of showing control signals of the LLC resonance converter operating in a first mode according to the present disclosure.
Figure 5B:
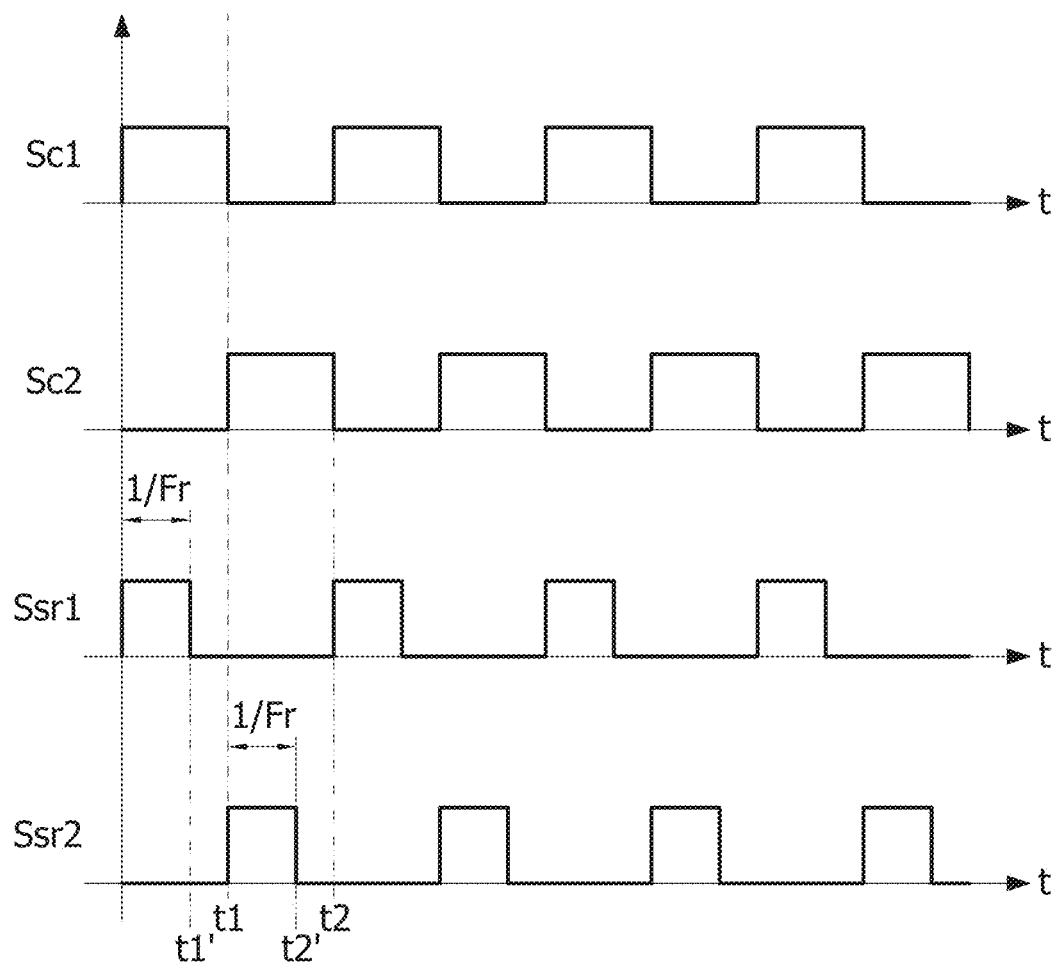
FIG. 5B is a schematic diagram of showing control signals of the LLC resonance converter operating in a second mode according to the present disclosure.
Figure 5C:
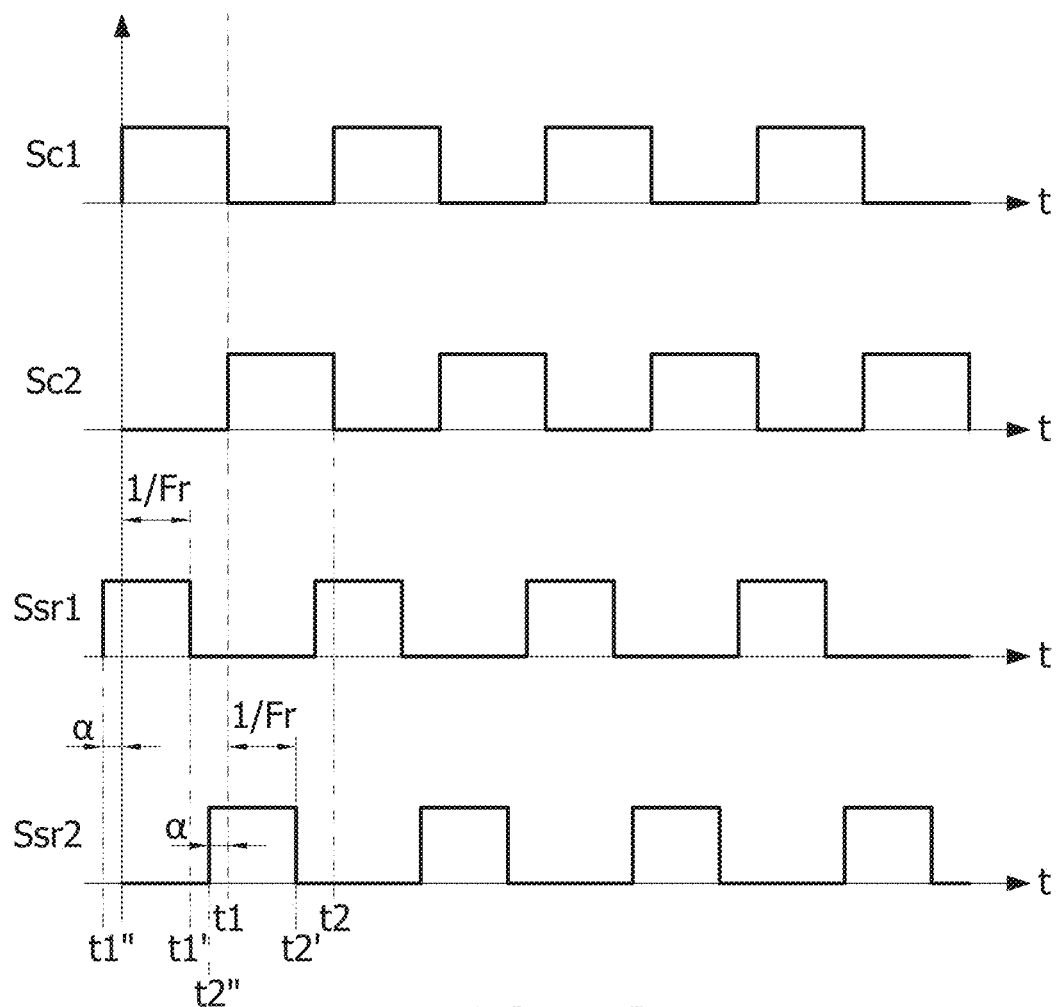
FIG. 5C is a schematic diagram of showing control signals of the LLC resonance converter operating in a third mode and a fourth mode according to the present disclosure.

Please refer to FIG. 5A to FIG. 5C, which show schematic diagrams of showing control signals of the LLC resonance converter operating in different modes according to the present disclosure, and also refer to FIG. 1 to FIG. 4B. In the first mode M1 in FIG. 5A, the first control signal Sc1 and the first rectification control signal Ssr1 provided by the control unit 5 are variable frequency signals with the same phase. Simultaneously, the second control signal Sc2 and the second rectification control signal Ssr2 provided by the control unit 5 are variable frequency signals with the same phase. Therefore, the phase shift amount Vs of the turned-on rising edge of the first control signal Sc1 and the first rectification control signal Ssr1 is zero degree, and the phase shift amount Vs of the turned-on rising edge of the second control signal Sc2 and the second rectification control signal Ssr2 is also zero degree.

In the second mode M2 in FIG. 5B, the first control signal Sc1 and the first rectification control signal Ssr1 provided by the control unit 5 are variable frequency signals with the same phase. Simultaneously, the second control signal Sc2 and the second rectification control signal Ssr2 are variable frequency signals with the same phase. That is, the phase shift amount Vs of the turned-on rising edge of the first control signal Sc1 and the first rectification control signal Ssr1 is zero degree, and the phase shift amount Vs of the turned-on rising edge of the second control signal Sc2 and the second rectification control signal Ssr2 is also zero degree. In this mode, the control unit 5 limits the duty cycles of the first rectification control signal Ssr1 and the second rectification control signal Ssr2 not to exceed the resonance period. The resonance period is the reciprocal of the resonance frequency Fr, which is 1/Fr.

In the third mode M3 and the fourth mode M4 in FIG. 5C, the control unit 16 adjusts the phase shift amount Vs of the first control signal Sc1 and the first rectification control signal Ssr1 according to the change of the input voltage Vin, and simultaneously adjusts the phase shift amount Vs of the second control signal Sc2 and the second rectification control signal Ssr2. That is, the phase shift amount Vs of the turned-on rising edge of the first control signal Sc1 and the first rectification control signal Ssr1 increases with the lower the frequency. As shown in FIG. 5C, for example, the phase shift amount Vs is represented by a specific angle α (corresponding to the magnitude of the phase shift amount Vs), and α is an arbitrary number from 0 to 180 and greater than 0. In particular, the control unit 5 controls the phase of the first rectification control signal Ssr1 to lead the phase of the first control signal Sc1. The specific control method is to control the turned-on period of the first synchronous rectification switch SR1 to increase so that the phase of the turned-on rising edge of the first rectification control signal Ssr1 is leading (from the original time 0 leading to time t1", that is, leading the specific angle α). The same is true for the second control signal Sc2 and the second rectification control signal Ssr2, and the detail description is omitted here for conciseness.

Therefore, when the operation frequency Fsw is lower than the phase shift frequency Fs, the control unit 5 limits the duty cycle to be higher than the resonance period so that the phase may be leading. With this control method, when the input voltage Vin is insufficient and the output voltage Vo starts to fall, the output voltage Vo of the LLC resonance converter 100 can still be maintained above a specific voltage for a period of time. Accordingly, the electronic product (such as the load 200) coupled to the rear end to have enough time to respond and perform complete storage or backup of the data before the power failure.

Figure 6:
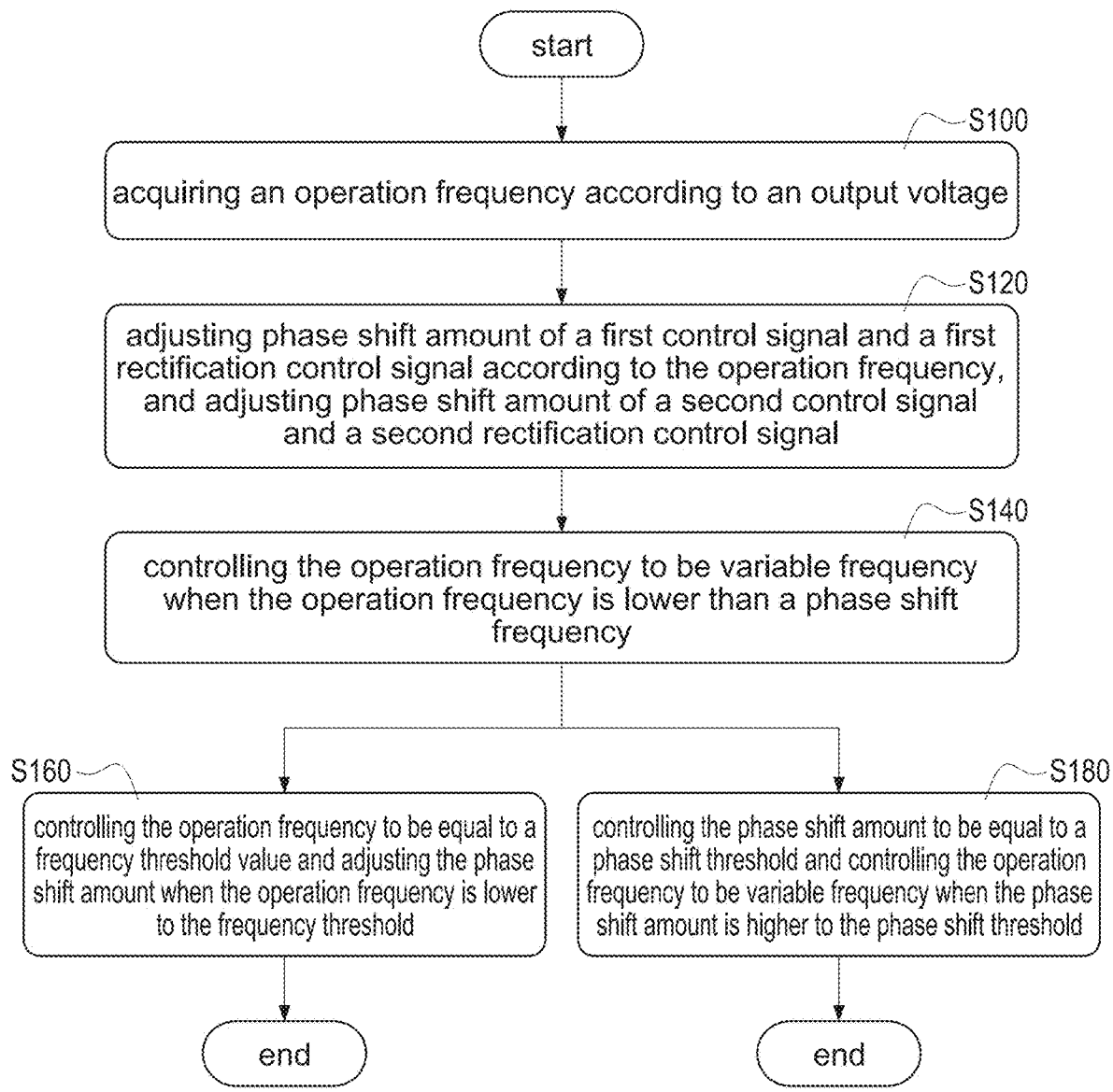
FIG. 6 is a flowchart of a method of controlling the LLC resonance converter according to the present disclosure.

Please refer to FIG. 6, which shows a flowchart of a method of controlling the LLC resonance converter according to the present disclosure, and also refer to FIG. 1 to FIG. 5C. The circuit structure of the LLC resonance converter 100 is shown in FIG. 2A to FIG. 2D. The method of controlling the LLC resonance converter 100 includes steps of: acquiring an operation frequency according to an output voltage (by feeding back the output voltage) (S100). In one embodiment, the control unit 5 receives the feedback of the output voltage Vo to determine the operation frequency Fsw of the first switch Q1, the second switch Q2, the first synchronous rectification switch SR1 and the second synchronous rectification switch SR2. Afterward, adjusting phase shift amount of the first control signal and the first rectification control signal according to the operation frequency, and adjusting phase shift amount of the second control signal and the second rectification control signal (S120). In one embodiment, the control unit 5 adjusts the phase shift amount Vs of the first control signal Sc1 and the first rectification control signal Ssr1 according to the change of the operation frequency Fsw, and the same is true for the second control signal Sc2 and the second rectification control signal Ssr2.

Afterward, determining whether the operation frequency is lower than the phase shift frequency, and controlling the operation frequency to be variable frequency and adjusted phase shift amount when the operation frequency is lower than the phase shift frequency (S140). In one embodiment, the control unit 5 determines whether the operation frequency Fsw is lower than the phase shift frequency Fs. When the operation frequency Fsw is higher than the phase shift frequency Fs, the control unit 5 controls the operation frequency Fsw of the first control signal Sc1 and the first rectification control signal Ssr1 to be variable frequency, and the phase shift amount Vs to be zero degree (the same is true for the second control signal Sc2 and the second rectification control signal Ssr2). When the operation frequency Fsw is lower than the phase shift frequency Fs, the control unit 5 controls the operation frequency Fsw of the first control signal Sc1 and the first rectification control signal Ssr1 to be variable frequency, and adjusts the phase shift amount Vs according to the change of the input voltage Vin (the same is true for the second control signal Sc2 and the second rectification control signal Ssr2). When the operation frequency Fsw is higher than the phase shift frequency Fs but lower than the resonance frequency Fr, the control unit 5 limits the duty cycle of the first rectification control signal Ssr1 and the second rectification control signal Ssr2 not to exceed the resonance period so as to prevent the energy of the secondary-side circuit 100-2 from being released to the primary-side circuit 100-1 during the switch operation. However, when the operation frequency Fsw is lower than the phase shift frequency Fs, the control unit 5 limits the duty cycle to be higher than the resonance period so that the phase may be leading.

Finally, controlling the operation frequency to be equal to a frequency threshold value and adjusting the phase shift amount when the operation frequency is lower to the frequency threshold (S160), or controlling the phase shift amount to be equal to a phase shift threshold and controlling the operation frequency to be variable frequency when the phase shift amount is higher to the phase shift threshold (S180).

For the fixed operation frequency Fsw in step (S160), in one embodiment, the control unit 5 controls the operation frequency Fsw of the first control signal Sc1 and the first rectification control signal Ssr1 to be equal to the frequency threshold Ft, and adjusts the phase shift amount Vs according to the change of the input voltage Vin (the same is true for the second control signal Sc2 and the second rectification control signal Ssr2). The control unit 5 controls the turned-on period of the first synchronous rectification switch SR1 to increase so that the phase of the turned-on rising edge of the first rectification control signal Ssr1 is leading, and similarly controls the turned-on period of the second synchronous rectification switch SR2 to increase so that the phase of the turned-on rising edge of the second rectification control signal Ssr2 is leading. For the fixed phase shift amount Vs in step (S180), in one embodiment, the control unit 5 controls the operation frequency Fsw of the first control signal Sc1 and the first rectification control signal Ssr1 to be variable frequency, and controls the phase shift amount Vs to be equal to the phase shift threshold Vt (the same is true for the second control signal Sc2 and the second rectification control signal Ssr2).

Figure 7A:
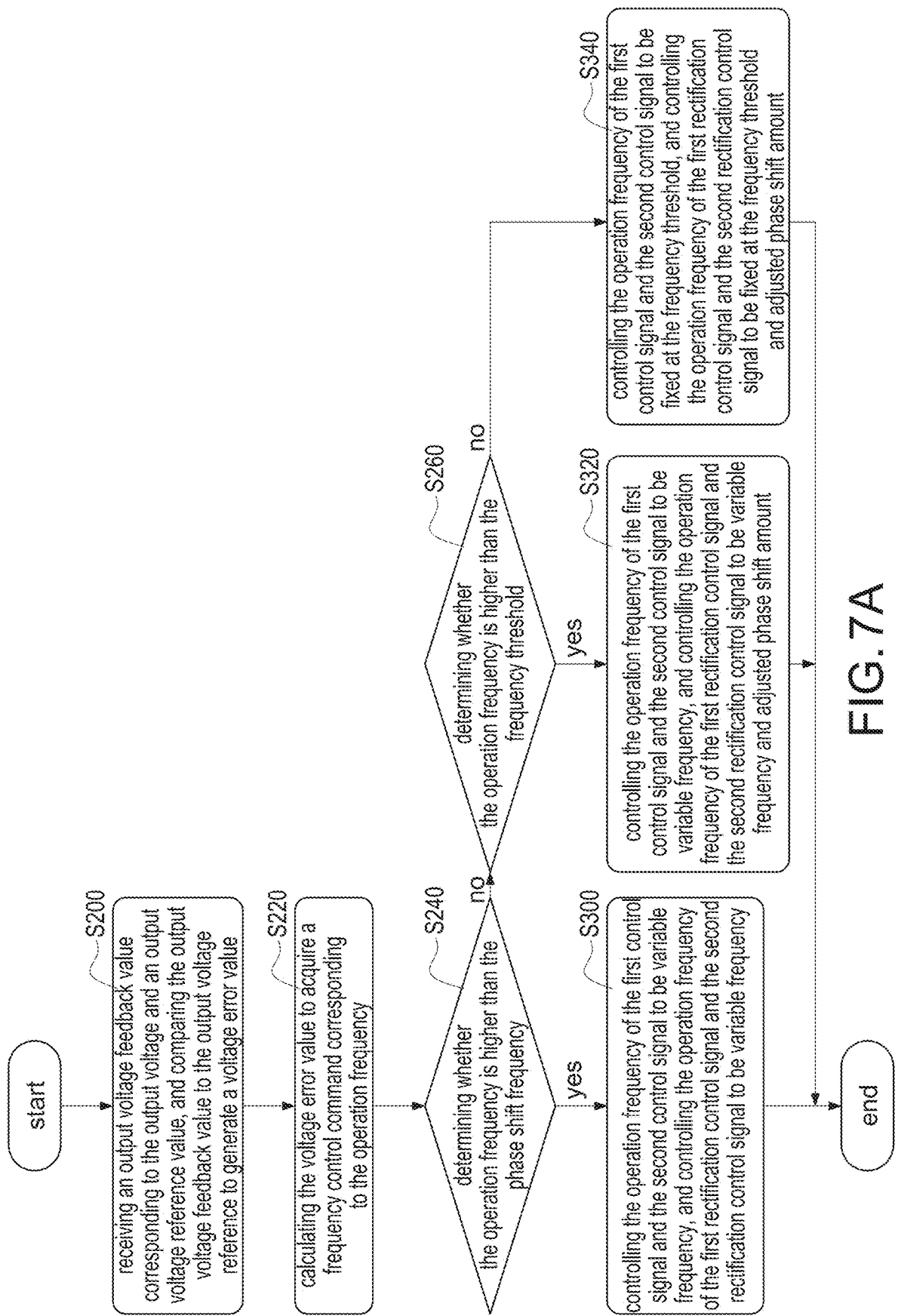
FIG. 7A is a detailed flowchart of operating the LLC resonance converter in a first control manner according to the present disclosure.
Figure 7B:
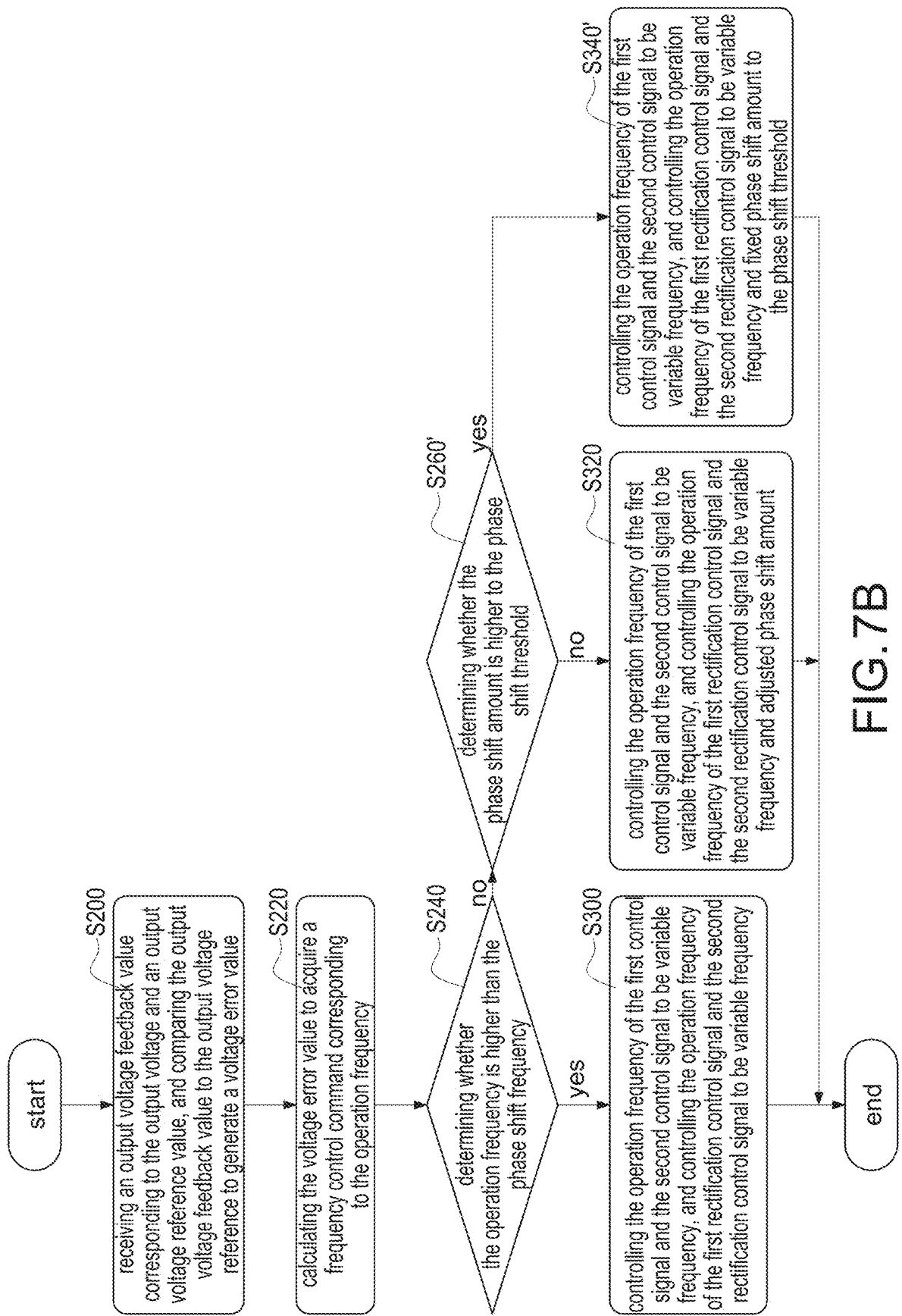
FIG. 7B is a detailed flowchart of operating the LLC resonance converter in a second control manner according to the present disclosure.

Please refer to FIG. 7A and FIG. 7B, which show detailed flowcharts of operating the LLC resonance converter in a first control manner and a second control manner according to the present disclosure, respectively, and also refer to FIG. 1 to FIG. 6. As shown in FIG. 7A, the method of controlling the LLC resonance converter 100 in the fixed operation frequency Fsw incudes steps of: receiving an output voltage feedback value corresponding to the output voltage and an output voltage reference value, and comparing the output voltage feedback value to the output voltage reference to generate a voltage error value (S200). Afterward, calculating the voltage error value to acquire a frequency control command corresponding to the operation frequency (S220). The control unit 5 modulates the first control signal Sc1 and the second control signal Sc2 interleaved to the first control signal Sc1 according to the frequency control command Cf, modulates the first rectification control signal Ssr1 corresponding to the first control signal Sc1 according to the frequency control command Cf, and modulates the second rectification control signal Ssr2 corresponding to the second control signal Sc2 according to the frequency control command Cf. In particular, the operation frequency Fsw is generated by the frequency control command Cf for control determination.

Afterward, determining whether the operation frequency is higher than the phase shift frequency (S240). If the operation frequency Fsw is higher than the phase shift frequency Fs, controlling the operation frequency of the first control signal and the second control signal to be variable frequency, and controlling the operation frequency of the first rectification control signal and the second rectification control signal to be variable frequency (S300). If the operation frequency Fsw is lower than the phase shift frequency Fs, determining whether the operation frequency is higher than the frequency threshold (S260). If the operation frequency Fsw is higher than the frequency threshold Ft, controlling the operation frequency of the first control signal and the second control signal to be variable frequency, and controlling the operation frequency of the first rectification control signal and the second rectification control signal to be variable frequency and adjusting the phase shift amount (S320). If the operation frequency Fsw is lower to the frequency threshold Ft, controlling the operation frequency of the first control signal and the second control signal to be fixed at the frequency threshold, and controlling the operation frequency of the first rectification control signal and the second rectification control signal to be fixed at the frequency threshold and adjusting the phase shift amount (S340).

As shown in FIG. 7B, steps (S200) to (S240), and (S300) to (S320) are the same as FIG. 7A, and differences lie in steps (S260') and (S340'). If the operation frequency Fsw is lower than the phase shift frequency Fs (i.e., the determination of step (S240) is "NO"), determining whether the phase shift amount is higher to the phase shift threshold (S260'). Otherwise, the step (S320) is performed. If the phase shift amount Vs is equal to the phase shift threshold Vt (i.e., the determination of step (S260') is "YES"), controlling the operation frequency of the first control signal and the second control signal to be variable frequency, and controlling the operation frequency of the first rectification control signal and the second rectification control signal to be variable frequency and fixing the phase shift amount to the phase shift threshold (S340').

Therefore, with the control methods shown in FIG. 7A and FIG. 7B, when the input voltage Vin is insufficient and the output voltage Vo starts to fall, the output voltage Vo of the LLC resonance converter 100 can still be maintained above a specific voltage for a period of time. Accordingly, the electronic product (such as the load 200) coupled to the rear end to have enough time to respond and perform complete storage or backup of the data before the power failure.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:
1. An LLC resonance converter, comprising:
a switching circuit, comprising a first switch and a second switch,
a resonance tank, coupled to the switching circuit,
a transformer, comprising a primary winding and a secondary winding, and the primary winding coupled to the resonance tank,
a synchronous rectification unit, coupled to the secondary winding, comprising a first synchronous rectification switch and a second synchronous rectification switch, and
a control unit, configured to provide a first control signal to control the first switch, a second control signal to control the second switch, a first rectification control signal to control the first synchronous rectification switch, and a second rectification control signal to control the second synchronous rectification switch according to an output voltage of the resonance converter; the first control signal and the first rectification control signal having an operation frequency and a phase shift amount, and the second control signal and the second rectification control signal having the operation frequency and the phase shift amount,
the control unit comprising:
a comparison unit, configured to receive an output voltage feedback value corresponding to the output voltage and an output voltage reference value, and compare the output voltage feedback value to the output voltage reference value to generate a voltage error value,
a voltage controller, configured to receive the voltage error value, and calculate the voltage error value to acquire a frequency control command corresponding to the operation frequency, and
a signal modulation unit, configured to modulate the first control signal and the second control signal interleaved to the first control signal according to the frequency control command, modulate the first rectification control signal corresponding to the first control signal according to the frequency control command, and modulate the second rectification control signal corresponding to the second control signal according to the frequency control command,
wherein the control unit controls the operation frequency to be variable frequency and adjusts the phase shift amount when the operation frequency is lower than a phase shift frequency, and controls the operation frequency to be equal to a frequency threshold and adjusts the phase shift amount, and
wherein the control unit controls a phase of the first rectification control signal to lead a phase of the first control signal, and controls a phase of the second rectification control signal to lead a phase of the second control signal when the operation frequency is lower than the frequency threshold.

2. The LLC resonance converter as claimed in claim 1, wherein the control unit limits a duty cycle of the first rectification control signal and the second rectification control signal not to exceed a resonance period when the operation frequency is higher than the phase shift frequency but lower than a resonance frequency.

3. The LLC resonance converter as claimed in claim 2, wherein the control unit limits the duty cycle to exceed the resonance period when the operation frequency is lower than the phase shift frequency.

4. The LLC resonance converter as claimed in claim 1, wherein the switching circuit comprises a first switch bridge arm composed of the first switch and the second switch to form a half bridge circuit.

5. The LLC resonance converter as claimed in claim 1, wherein the switching circuit comprises a first switch bridge arm composed of the first switch and the second switch, and a second switch bridge arm composed of a third switch and a fourth switch to form a full bridge circuit.

6. The LLC resonance converter as claimed in claim 1, wherein the transformer is a center-tapped transformer, and the first synchronous rectification switch and the second synchronous rectification switch are respectively coupled to two ends of the transformer.

7. The LLC resonance converter as claimed in claim 1, wherein the transformer is coupled to a first synchronous rectification bridge arm composed of the first synchronous rectification switch and the second synchronous rectification switch, and coupled to a second synchronous rectification bridge arm composed of a third synchronous rectification switch and a fourth synchronous rectification switch to form a full bridge rectification circuit.

8. An LLC resonance converter, comprising:
   a switching circuit, comprising a first switch and a second switch,
   a resonance tank, coupled to the switching circuit,
   a transformer, comprising a primary winding and a secondary winding, and the primary winding coupled to the resonance tank,
   a synchronous rectification unit, coupled to the secondary winding, comprising a first synchronous rectification switch and a second synchronous rectification switch, and
   a control unit, configured to provide a first control signal to control the first switch, a second control signal to control the second switch, a first rectification control signal to control the first synchronous rectification switch, and a second rectification control signal to control the second synchronous rectification switch according to an output voltage of the resonance converter; the first control signal and the first rectification control signal having an operation frequency and a phase shift amount, and the second control signal and the second rectification control signal having the operation frequency and the phase shift amount,
   the control unit comprising:
      a comparison unit, configured to receive an output voltage feedback value corresponding to the output voltage and an output voltage reference value, and compare the output voltage feedback value to the output voltage reference value to generate a voltage error value,
      a voltage controller, configured to receive the voltage error value, and calculate the voltage error value to acquire a frequency control command corresponding to the operation frequency, and
      a signal modulation unit, configured to modulate the first control signal and the second control signal interleaved to the first control signal according to the frequency control command, modulate the first rectification control signal corresponding to the first control signal according to the frequency control command, and modulate the second rectification control signal corresponding to the second control signal according to the frequency control command,
   wherein the control unit controls the operation frequency to be variable frequency and adjusts the phase shift amount when the operation frequency is lower than a phase shift frequency, and controls the phase shift amount to be equal to a phase shift threshold and controls the operation frequency to be variable frequency when the phase shift amount is higher than the phase shift threshold, and
   wherein the control unit controls a phase of the first rectification control signal to lead a phase of the first control signal, and controls a phase of the second rectification control signal to lead a phase of the second control signal when the operation frequency is lower than a frequency threshold.

9. The LLC resonance converter as claimed in 8, wherein the control unit limits a duty cycle of the first rectification control signal and the second rectification control signal not to exceed a resonance period when the operation frequency is higher than the phase shift frequency but lower than a resonance frequency.

10. The LLC resonance converter as claimed in 9, wherein the control unit limits the duty cycle to exceed the resonance period when the operation frequency is lower than the phase shift frequency.

11. An A method of controlling an LLC resonance converter, the LLC resonance converter comprising a switching circuit, a transformer, and a synchronous rectification unit; the switching circuit comprising a first switch controlled by a first control signal and a second switch controlled by a second control signal; the synchronous rectification unit comprising a first synchronous rectification switch controlled by a first rectification control signal and a second synchronous rectification switch controlled by a second rectification control signal; the first control signal, the second control signal, the first rectification control signal, the second rectification control signal having an operation frequency,
   the method comprising steps of:
      acquiring the operation frequency according to an output voltage,
      adjusting a phase shift amount of the first control signal and the first rectification control signal and adjusting the phase shift amount of the second control signal and the second rectification control signal according to the operation frequency,
      determining whether the operation frequency is lower than a phase shift frequency,
      controlling the operation frequency to be variable frequency and adjusting the phase shift amount when the operation frequency is lower than the phase shift frequency,
      controlling the operation frequency to be equal to a frequency threshold and adjusting the phase shift amount when the operation frequency is lower than the frequency threshold,
      controlling a phase of the first rectification control signal to lead a phase of the first control signal, and controlling a phase of the second rectification control signal to lead a phase of the second control signal when the operation frequency is lower than the frequency threshold,
      receiving an output voltage feedback value corresponding to the output voltage and an output voltage reference value, and comparing the output voltage feedback value to the output voltage reference value to generate a voltage error value,
      calculating the voltage error value to acquire a frequency control command corresponding to the operation frequency, modulating the first control signal and the second control signal interleaved to the first control signal according to the frequency control command, and modulating the first rectification control signal corresponding to the first control signal according to the frequency control command, and modulating the second rectification control signal corresponding to the second control signal according to the frequency control command.

12. The method of controlling the LLC resonance converter as claimed in 11, further comprising a step of:

limiting a duty cycle of the first rectification control signal and the second rectification control signal not to exceed a resonance period when the operation frequency is higher than the phase shift frequency but lower than a resonance frequency.

13. The method of controlling the LLC resonance converter as claimed in 12, further comprising a step of:

limiting the duty cycle to exceed the resonance period when the operation frequency is lower than the phase shift frequency.

14. A method of controlling an LLC resonance converter, the LLC resonance converter comprising a switching circuit, a transformer, and a synchronous rectification unit; the switching circuit comprising a first switch controlled by a first control signal and a second switch controlled by a second control signal; the synchronous rectification unit comprising a first synchronous rectification switch controlled by a first rectification control signal and a second synchronous rectification switch controlled by a second rectification control signal; the first control signal, the second control signal, the first rectification control signal, the second rectification control signal having an operation frequency, the method comprising steps of:

acquiring the operation frequency according to an output voltage, adjusting a phase shift amount of the first control signal and the first rectification control signal and adjusting the phase shift amount of the second control signal and the second rectification control signal according to the operation frequency, determining whether the operation frequency is lower than a phase shift frequency, controlling the operation frequency to be variable frequency and adjusting the phase shift amount when the operation frequency is lower than the phase shift frequency, controlling the phase shift amount to be equal to a phase shift threshold and controlling the operation frequency to be variable frequency when the phase shift amount is higher than the phase shift threshold, controlling a phase of the first rectification control signal to lead a phase of the first control signal, and controlling a phase of the second rectification control signal to lead a phase of the second control signal when the operation frequency is lower than a frequency threshold, receiving an output voltage feedback value corresponding to the output voltage and an output voltage reference value, and comparing the output voltage feedback value to the output voltage reference value to generate a voltage error value, calculating the voltage error value to acquire a frequency control command corresponding to the operation frequency, modulating the first control signal and the second control signal interleaved to the first control signal according to the frequency control command, and modulating the first rectification control signal corresponding to the first control signal according to the frequency control command, and modulating the second rectification control signal corresponding to the second control signal according to the frequency control command.

15. The method of controlling the LLC resonance converter as claimed in 14, further comprising a step of:

limiting a duty cycle of the first rectification control signal and the second rectification control signal not to exceed a resonance period when the operation frequency is higher than the phase shift frequency but lower than a resonance frequency.

16. The method of controlling the LLC resonance converter as claimed in 15, further comprising a step of:

limiting the duty cycle to exceed the resonance period when the operation frequency is lower than the phase shift frequency.

* * * * *